June 11, 1929.  J. G. MELENDY  1,716,498

PROCESS FOR CONVERSION OF $SO_2$ TO $SO_3$

Filed Jan. 26, 1927

INVENTOR
JESSE G. MELENDY
BY
ATTORNEY

Patented June 11, 1929.

1,716,498

UNITED STATES PATENT OFFICE.

JESSE G. MELENDY, OF TARRYTOWN, NEW YORK, ASSIGNOR TO GENERAL CHEMICAL COMPANY, OF NEW YORK, N. Y., A CORPORATION OF NEW YORK.

PROCESS FOR CONVERSION OF $SO_2$ TO $SO_3$.

Application filed January 26, 1927. Serial No. 163,595.

This invention relates to an improved method of conducting the conversion of sulfur dioxide to sulfur trioxide by means of contact or catalytic processes.

The object of the invention is the provision of an improved method wherein optimum operating conditions may be closely approached in commercial practice and considerable saving effected in the amount of platinum or other catalyst required to bring about a substantially complete conversion of sulfur dioxide to trioxide.

The reaction of sulfur dioxide plus oxygen to give sulfur trioxide is an exothermal reversible reaction, as is well-known, and considerable heat is evolved as the reaction takes place. When operating in accordance with the contact process this reaction is caused to take place in the presence of a catalyst, to increase the rate of reaction. Of those catalysts known at the present time, platinum is the most satisfactory and most widely used. The heat generated by the conversion of the sulfur dioxide to sulfur trioxide when not continuously removed raises the temperature of the gases to such an extent that an equilibrium condition is approached. As the conditions of temperature and conversion approach the point of equilibrium, the rate of reaction falls off to an exceedingly small value. To carry on the conversion under such conditions requires a very long time of contact of the gases with the catalyst or in other terms, a very large amount of contact substance. On the other hand, when the temperature is favorable and the conditions of conversion and temperature are maintained considerably below equilibrium the rate of reaction is high so that only a short time of contact of the gases with the catalyst or a smaller amount of catalyst is required. As the cost of the catalyst, particularly platinum, is a major item of expense in the production of sulfuric acid by the contact process, a reduction in the amount of catalyst required is of importance.

Heretofore various methods have been proposed to effect a substantially complete conversion of sulfur dioxide to sulfur trioxide in as short a period of time or with as small a quantity of catalyst as possible. Knietsch, in his U. S. Patent #652,119, has pointed out the necessity for temperature control during the conversion process and has endeavored to provide a method of obtaining quantitative conversion by removing the excess heat of the reaction from the contact chamber. He has also pointed out in his U. S. Patent #823,472, the desirability of conducting the conversion process in a plurality of stages with intermediate cooling of the partially converted gases. The systems thus far disclosed are, however, open to the objections that definite, controlled temperature conditions cannot be maintained in the systems and that a proper distribution of the catalyst has not been attained. I have discovered certain further essential operating conditions and improvements in the general process whereby results approximating those obtained under theoretical optimum operating conditions may be obtained.

The conditions which I have found to be necessary for most efficient operation are as follows:

1. Maintenance of uniform temperature conditions throughout the catalyst at right angles to the direction of gas flow.

2. Positive, controlled regulation of the temperature of the gases entering each conversion stage.

3. Correct proportioning of the amount of catalyst in the several conversion stages, as more fully explained hereinafter. After considerable experimentation I have found that all of the above necessary conditions are maintained when operating as follows:

1. Carrying on the conversion reaction in adiabatic stages.

2. Cooling the gases with positive, controllable cooling means intermediate the conversion stages.

3. So proportioning the amount of catalyst in each stage except the last stage, as to cause the gas to pass out of contact with the catalyst, and thus stop the reaction when the rate of the reaction begins to fall off, and so proportioning the amount of catalyst in the last stage as to bring the reaction to substantial equilibrium only in this stage.

By carrying on the reaction in adiabatic stages, I am enabled to maintain uniform temperature conditions in the catalyst at right angles to the direction of gas flow and thus am able to determine temperature conditions throughout the entire mass of the catalyst. This of course is not possible with those systems in which positive cooling of the catalyst chamber is employed, and a highly variable heat gradient obtained from the center of the contact mass outwardly. It is practically impossible to determine what temperature is existing at any given point within a contact mass where there is positive external cooling and the temperature varies not only in the direction of gas flow but also at right angles to this direction. Furthermore, it is impossible to predetermine what temperature changes will take place if the gas speed, or strength of gas, is changed, as not only is the heat generated changed, but likewise the cooling effect. Contrasted with this is the operation of a converter without external cooling. By not permitting any substantial heat gradient to exist at right angles to the direction of gas flow, and only having to contend with a variation in the direction of gas flow, it becomes possible to predetermine conditions, because the only substantial change brought about by a change in gas speed, or strength of gas, is a change in the heat generated. It is only by accurate knowledge of temperature conditions, such as is obtained in accordance with my procedure, that efficient operation becomes possible.

The provision of positive controllable cooling means intermediate the conversion stages permits any desired definite temperature to be maintained in the gases entering each conversion stage.

As above pointed out, the temperature reached in any conversion stage will depend upon the amount of sulfur dioxide converted to sulfur trioxide in this stage, and as this temperature rises the rate of the reaction decreases. This rate is high and relatively constant up to a certain temperature, which may be determined for each concentration of sulfur dioxide, and then above this temperature begins to fall off very rapidly. By providing only sufficient platinum to reach the point where the rate of conversion begins to fall off, I am enabled to convert a much larger quantity of sulfur dioxide to sulfur trioxide with a given amount of platinum.

For purposes of illustration I have shown my invention in the accompanying drawing as applied to a three-stage converter system. The method of operation of the known multi-stage converter system together with my method, are diagrammatically shown together in order that the distinction between my process and the present art may be easily understood. In the drawings.

Figure 1:
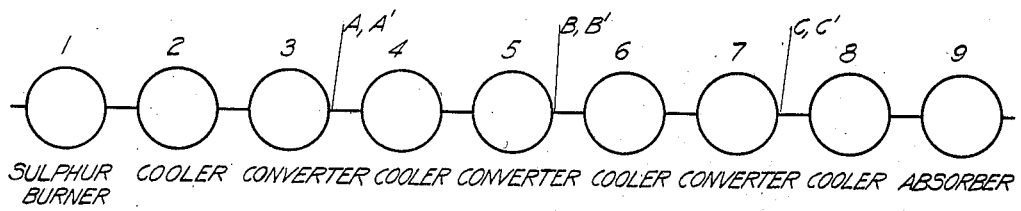
Fig. 1 illustrates diagrammatically a set-up of apparatus by means of which my invention may be practiced.
Figure 2:
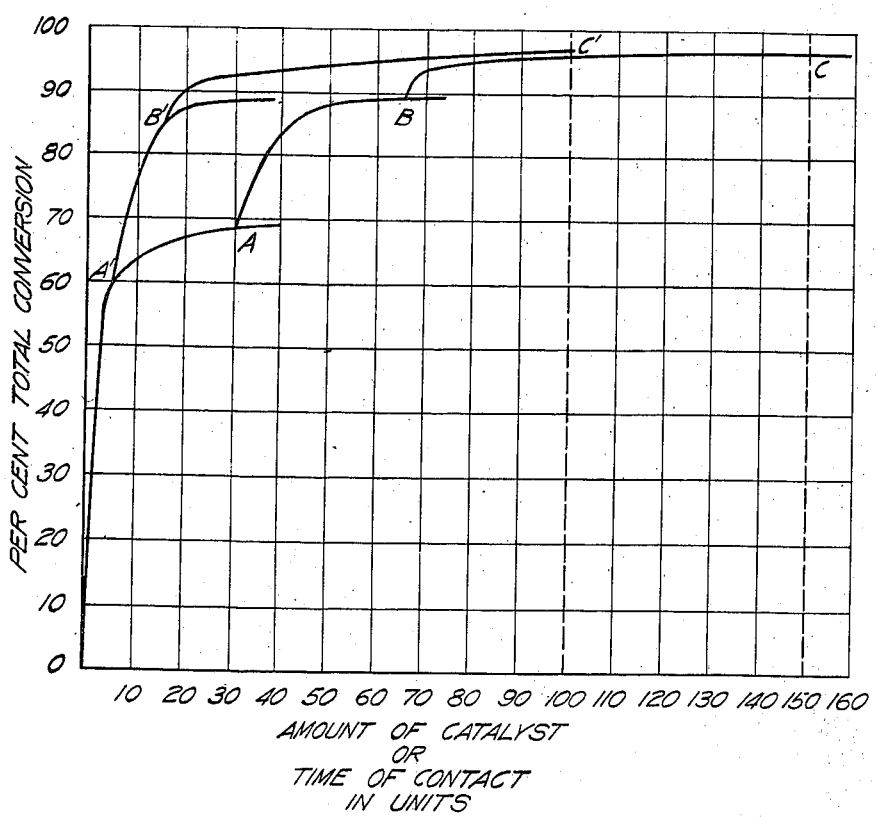
Fig. 2 shows the curves on the basis of which the conversion process proceeds.

In Fig. 2 the ordinates represent the percentage conversion of sulfur dioxide to trioxide throughout the system and the abscissas represent the time of contact of the gases with the catalyst, which for a given production is equivalent to the amount of catalyst required to effect the said conversion. The curves of Fig. 2 represent specifically the course of the conversion reaction when using platinum as the catalyst, although the general form of such curves will be similar irrespective of the particular catalyst.

The common method of operating a multi-stage converter with intermediate cooling would be illustrated by leading the gases from a sulfur burner 1 through the cooler 2 before introducing said gases into the first converter 3. In this converter the conversion is carried up to the point A on the curve of Fig. 2, the point A representing practically equilibrium conditions, or at least substantially the maximum conversion possible of being obtained in a single converter of whatever type employed. The gases would then be cooled in cooler 4 before passing into the next converter 5, wherein the same operation as in converter 3 would be repeated and the conversion carried up to a point B in Fig. 2. The gases would then be cooled again in the cooler 6 and passed to the final converter 7, wherein the conversion would be carried up to the point C in Fig. 2.

According to the present method, a sulfur dioxide gas mixture is evolved from burner 1 and cooled in cooler 2 to the temperature desired for the first conversion stage, which will be in the neighborhood of 400° C. or that temperature most efficient for the gas mixture used. This gas mixture at a definite temperature is introduced into converter 3. From a study of Fig. 2 representing the course of the conversion reaction, it will be seen that the rate of conversion is quite rapid up to within the neighborhood of the point A′. It will be seen that in order to increase the percentage conversion obtained at the point A′ to that at point A the amount of platinum required is many times that necessary if the conversion is stopped at point A′. My method of operation makes use of this fact, and consequently only that amount of platinum is placed in the converter as will carry the reaction to point A′, the gases then being withdrawn from the converter and subjected to a cooling action in the cooler 4.

The gases, after being cooled in cooler 4 to substantially 400° C. are then introduced into converter 5, wherein conversion takes place along the curve A' B' of Fig. 2. Following the principle employed by me, only that amount of platinum is placed in converter 5 as will carry the reaction to the point B' or at that point where the rate of reaction again begins to fall off.

The gases are then cooled in cooler 6 and introduced into the final converter 7 in which the conversion is carried to whatever overall conversion is desired in the system, which ordinarily will be in the neighborhood of 95–97%.

In the final converter 7 only is placed sufficient platinum to bring the reaction to substantial equilibrium. As will be seen from Fig. 2, the amount of platinum required to carry the reaction from point B' to point C' is much greater than that required to reach point A' or point B'. This is due to the fact that the amount of platinum required to overcome the low reaction rate obtaining at the higher percentages of conversion when approaching equilibrium is much greater than when operating at the higher reaction rates obtaining at the lower conversions when operating in accordance with my process. Following the conversion in converter 7 the gases are then cooled in cooler 8 and passed to the absorber 9 in which the sulfur trioxide is absorbed in sulfuric acid to produce the final product.

By comparing the relative amounts of platinum required to reach the points C and C' in Fig. 2, which points represent substantially the same overall conversions, it will be seen that my procedure enables the quantity of platinum to be very materially reduced. This is because of the great saving in platinum which I obtain in the earlier stages of conversion by stopping the reaction in these stages as soon as the reaction rate begins to fall off.

When employing a gas containing 8–12% $SO_2$ and conducting the conversion in three stages I propose to stop the conversion in the first stage when it has reached a value of 8–12% below that which might be obtained at equilibrium if the reaction were continued adiabatically. The conversion in the second stage is carried to a value about 4–6% below the corresponding equilibrium value, while the conversion is caused to go to substantial equilibrium in the third or last converter. Thus where gas containing 8–12% $SO_2$ gas is introduced into the successive converters at approximately 400° C. the equilibrium conversions in the first and second converters will be about 70% and 90% respectively. I have found that most efficient operation is obtained, however, if the conversion be carried only to 60% in the first converter, 85% in the second converter and completed to 95–97% in the last converter. When operating in this manner, I have found that for a three-stage converter system operating on an 8–12% gas the proportions of platinum in the various stages should be in the ratio of 4–6% in the first stage, 10–14% in the second stage and 80–86% in the third stage. When the conversion is carried out in a system with such a distribution of platinum and in adiabatic stages with positive intermediate cooling, temperature conditions will be obtained which approach the theoretical optimum conditions for obtaining final conversions of 95–97% and thus require a minimum quantity of platinum.

It will be seen that by stopping the reaction in each converter except the last, before equilibrium conditions are approached, I am not required to overcome the low reaction rate obtaining in the neighborhood of equilibrium except in the last converter, and thus obtain the same overall conversion as in the known processes with a great saving in catalyst. The amount of catalyst saved in the first converters is much greater than the additional amount required in the final converter to handle the slightly greater amount of sulfur dioxide present here than in the final converter of the known systems. The overall saving is considerable and results in lower operating costs.

In applying my invention to commercial practice in the design of the converter units of a contact sulfuric acid plant, or in repacking the converter units of an operating plant to obtain greater efficiency, the basis for calculations will be the volume and the percentage strength of sulfur dioxide gas which must be handled per unit of time to give the tonnage of sulphuric acid required of the plant. The percentage strength of sulfur dioxide will be determined by the nature of the sulfur-bearing raw material (pyrites ore, brimstone, etc.) and the type of ore or brimstone burning equipment. The volume of this strength of gas which must be handled to produce the tonnage of acid required will enable the designing engineer to determine the dimensions of the contact chambers in which the catalyst is to be placed to give commercial gas speeds through the system, in accordance with standard practice in the contact sulfuric acid art. A satisfactory gas speed having been determined upon, the next consideration will be the amounts of catalyst to be placed in the various stages of the system to give the proper time of contact of the gas with the catalyst in each stage.

The amount of catalyst will depend upon the gas speed and strength of sulfur dioxide (previously determined as explained above) and the nature of the catalyst which is to be used. Factors affecting the nature of the catalyst are the chemical and physical properties of the catalyst, particularly the activity of the catalyst, the type of catalyst carrier (asbestos, magnesium, sulfate, etc.) the method of distribution of the catalyst upon the carrier, the concentration of catalyst in the carrier, the method of packing the catalyst in the contact chamber, etc., and consequently the nature and activity of different catalysts will vary considerably and can be determined only by previous experience with a particular catalyst or by preliminary experiments with the catalyst to be used. Previous experience with the particular catalyst which is to be used will enable the engineer to determine the amounts of catalyst required to give a series of varying percentages of conversion, under adiabatic conditions and at the gas speed determined upon, of sulfur dioxide gas of the predetermined strength to be used in the system. If the information regarding previous operation is not available it will be necessary to run a number of preliminary experiments to determine the amounts of the particular catalyst which are required to give a series of different degrees of conversion of the gas to be handled in the system. These experiments may be conducted by placing a series of increasing amounts of catalyst in an experimental scale converter chamber, passing through the chamber a stream of sulfur dioxide gas of a strength equal to, and at a gas speed equivalent to, that to be used in the commercial system, and determining the percentage of sulfur dioxide converted to sulfur trioxide. In conducting such experiments it is, of course, essential to simulate plant conditions as nearly as possible by maintaining the inlet temperature of the gas at about 400° C. and by insulating the converter chamber. Having obtained this data, either by previous experience or by experimental tests, a curve similar to the curve $O—A^1—A$ of Fig. 2 should then be plotted, and a point determined upon this curve, where the rate of reaction, and percentage conversion obtained per unit of catalyst, begins to rapidly fall off. This point will correspond to the point $A'$ of Fig. 2. The amount of catalyst to be used in the first converter stage will then be the amount required to reach this point.

The designing engineer should then provide for cooling the gases to the proper extent, i. e. to about 400° C. by positive, controllable cooling means, and then another curve should be plotted beginning at the point corresponding to point $A'$ to determine the amount of catalyst required for the second stage. As is well known, the composition of the gas will be changed following the first converter stage, owing to the conversion of a certain amount of the sulfur dioxide and oxygen to sulfur trioxide, and the new composition may be readily determined by calculation based upon the percentage conversion which has taken place. This new gas composition should, of course, be used in making use of prior data, or in running experiments, upon which to base the curve for the second stage. In other respects the procedure for plotting the curve for the second stage will be exactly the same as for the first stage. When handling a weak sulfur dioxide gas generating a relatively small amount of heat in the conversion reaction it may be found that the curve for the second stage extends upwardly within the neighborhood of 95–97% conversion, or whatever overall conversion is desired in the system, without requiring an excessive amount of catalyst. Under these conditions the system may be limited to a two stage system and the conversion carried substantially to equilibrium in the second and final stage. For example, under most conditions when using a platinum catalyst a two stage system of operation will be found efficient for use with a gas containing up to within the neighborhood of 7% sulphur dioxide. Above this strength of gas it will generally be found more economical in platinum to place sufficient catalyst in the second stage to bring the reaction only to the point where the rate of reaction begins to rapidly fall off, such for instance as the point $B^1$ of Fig. 2, and then to bring the reaction to substantial equilibrium in a third and final converter. With gas strengths above 12% four stages may be found most economical. In any case the proper number of stages which will be most economical in platinum for a given gas strength may be determined by plotting the curves for operation with various numbers of stages (in the manner described above for the first and second stages) and determining which arrangement will require the least amount of platinum for a given overall percentage conversion.

The system will be capable of continuous operation with but little fluctuation. If by reason of changing trade conditions it becomes necessary to change the strength of gas being handled, the system will be found to be quite flexible in its adaptability to strengths of gas differing from that strength for which the system was designed. For example, a three-stage system designed particularly for a 9% gas may be used with an 11% gas. Under these conditions the overall conversion will drop slightly, but by adequate removal of heat in the heat transferrers to take care of the additional heat generated in the conversion of the stronger gas, the total conversion will compare favorably with conversions in a plant where equilibrium is reached in every converter stage. The system may then not be operating at maximum efficiency, but nevertheless a substantial saving in platinum will be effected by reason of the employment of the principles of my invention.

While I have illustrated my invention in connection with a three-stage converter system, it is of course clear that the broader principles of my invention may be applied irrespective of the number of stages. The essential conditions to be observed in any case are to carry on the reaction in adiabatic stages, with positive intermediate cooling, to stop the reaction in all but the final converter at that point where the reaction rate begins to fall off and then to carry the conversion to substantial equilibrium only in the final converter, and to place the proper quantity of platinum in each converter to obtain the latter result. When operating a three-stage system the relative proportions of platinum in the stages should be substantially as indicated above. These proportions will vary, of course, with the number of stages.

By the term "adiabatic" as used in the specification and claims I mean to include any operation of the converter without a positive cooling action thereupon, that is, where precautions are taken to conserve the heat within the converter, as by proper heat insulation. It is of course clear that even with heat insulation of the converters a certain amount of heat will be lost by radiation and convection. By "positive cooling" I mean such cooling as is designed to accomplish the abstraction of a definite amount of heat from, or the attainment of a definite lowering in temperature of, the hot gases in the system, as distinguished from cooling resulting merely from radiation and convection, or other means where the abstraction of heat from the system varies and is not controlled.

I have given, as an illustrative example, the application of my invention to a process in which a substantially quantitative yield has been obtained before absorption of the sulfur trioxide produced. It is clear, however, that my invention is not limited to such an application. The reaction, for instance, may be carried on in stages with intermediate absorption of the sulfur trioxide produced. In this case the first converters will be run below equilibrium conditions, and the conversion carried to substantial equilibrium only in the final converter, in a manner similar to the first mentioned system.

I claim:

1. The process of converting sulfur dioxide to sulfur trioxide by catalytic oxidation which consists in carrying on the conversion in separate adiabatic stages, controlling the temperature of the gases entering the conversion stages by positive cooling, causing the conversion reaction in all but the final stage to proceed only to that point at which the reaction rate begins to rapidly fall off, and carrying the reaction to substantial equilibrium only in the final converter.

2. The improvement in the process of converting sulfur dioxide to sulfur trioxide by catalytic oxidation in which the reaction is carried on in separate stages with separate intermediate cooling of the partially converted gases to the temperature desired for the next conversion, which consists in so proportioning the amounts of catalyst in the various stages as to obtain substantial equilibrium conversion only in the last section of catalyst material.

3. The process of converting sulfur dioxide to sulfur trioxide by catalytic oxidation which consists in carrying on the conversion in separate stages, maintaining substantially uniform temperature conditions throughout the catalyst at right angles to the direction of gas flow, controlling the temperature of the gases entering the conversion stages, causing the conversion reaction in all but the final stage to proceed only to that point at which the reaction rate begins to rapidly fall off, and carrying the reaction to substantial equilibrium only in the final converter.

4. The process of converting sulfur dioxide to sulfur trioxide by means of a platinum catalyst which consists in carrying on the conversion in three adiabatic stages, controlling the temperature of the gases entering the conversion stages, passing the gases in each stage in contact with amounts of platinum constituting the following percentages of the whole, first stage 4–6%, second stage 10–14%, third stage 80–86% and providing sufficient total platinum to bring about an overall conversion of approximately 95–97%.

5. The process of converting sulfur dioxide to sulfur trioxide by catalytic oxidation which consists in carrying on the conversion in three stages, maintaining substantially uniform temperature conditions throughout the catalyst at right angles to the direction of gas flow, cooling the gas intermediate the stages, introducing the gas into the successive stages at approximately 400° C. and proportioning the amount of platinum in the successive stages to obtain conversions of approximately 60%, 85% and 95–97%, in the first, second and third converters respectively.

6. The process of converting sulfur dioxide to sulfur trioxide by catalytic oxidation which consists in carrying on the conversion of a gas containing 8–12% $SO_2$ in three substantially adiabatic stages, introducing the gas into the first stage at approximately 400° C., providing an amount of platinum in the first converter to obtain only a conversion of 8–12% below the equilibrium conversion, cooling the gas to approximately 400° C. and introducing the cooled gas into the second converter, providing an amount of platinum in the second converter to obtain only a conversion of 4–6% below equilibrium conversion, cooling the gas to approximately 400° C. and introducing the cooled gas into the third converter, and providing an amount of platinum in the third converter to obtain a final conversion of approximately 95–97%.

7. In the process of converting sulfur dioxide to sulfur trioxide by catalytic oxidation in which the reaction is carried on in stages, that improvement which comprises controlling the temperature and proportioning the amount of catalyst in the stages, except the last stage, so as to cause the gas to pass out of contact with the catalyst at about the time when the rate of reaction begins to fall off substantially and then carrying the reaction to substantial equilibrium only in the last stage.

In testimony whereof, I affix my signature.

JESSE G. MELENDY.